United States Patent [19]

Hoffman

[11] 4,213,343
[45] Jul. 22, 1980

[54] KINEMATIC INERTIAL SENSOR

[75] Inventor: Jay Hoffman, Livingston, N.J.

[73] Assignee: The Singer Company, Little Falls, N.J.

[21] Appl. No.: 34,110

[22] Filed: Apr. 30, 1979

[51] Int. Cl.³ .............................................. G01P 15/08
[52] U.S. Cl. ................................ 73/505; 73/516 LM
[58] Field of Search .................. 73/504, 505, 516 LM, 73/517 R, 516 R; 74/5 R, 5 SF

[56] References Cited

U.S. PATENT DOCUMENTS

| | | | |
|---|---|---|---|
| 3,083,578 | 4/1963 | Rosato et al. | 73/504 |
| 3,142,991 | 8/1964 | Pittman | 73/516 LM X |
| 3,618,399 | 11/1971 | Aske | 73/505 |

*Primary Examiner*—James J. Gill
*Attorney, Agent, or Firm*—John C. Altmiller; T. W. Kennedy

[57] ABSTRACT

A kinematic inertial sensor is provided for measuring angular velocity and position relative to inertial space about one or more measurement axes. The kinematic inertial sensor includes an angular rate sensor having a ring of conducting fluid contained in a housing, a set of gimbals for supporting the angular rate sensor, signal generating means, torque applying means, angle measuring means, resolver means, component processing means, and signal applying means.

2 Claims, 5 Drawing Figures

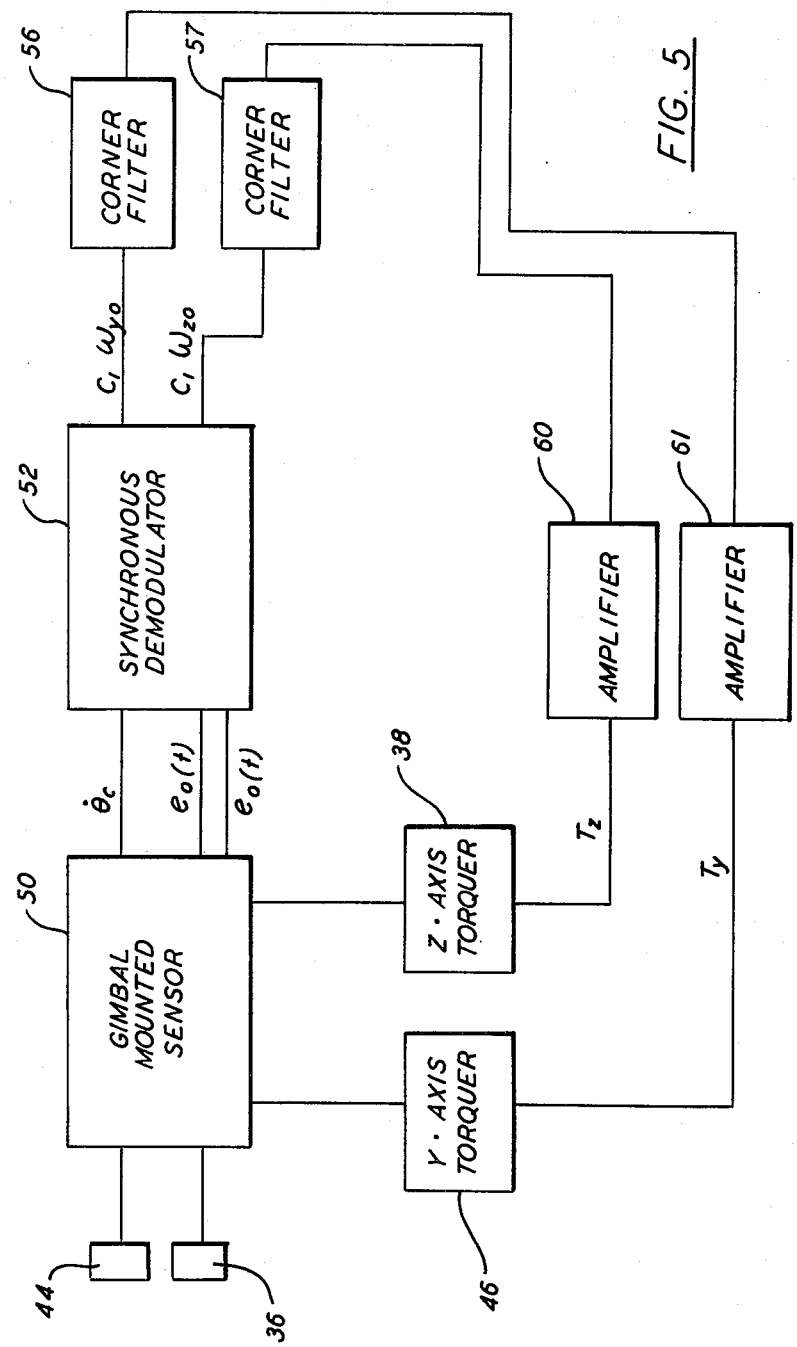

KINEMATIC INERTIAL SENSOR

BACKGROUND OF THE INVENTION

1. Field of the Invention

This invention relates to new and improved motion sensors and, more particularly, to non-gyroscopic sensors for measuring inertial angle.

2. Brief Summary of the Invention

This invention concerns a sensor of a non-gyroscopic type which depends upon the kinematic coupling of an angular rate vector to an inertia bearing annulus in which sensing of the angular rate is accomplished by a fluid. For this purpose, a liquid ring is carried within a housing which is supported for rotation on a spindle axis passing through a diameter of the ring. The housing may take the form of a disc or sphere. The ring is spun about this axis at a constant angular velocity. While the ring is so spinning, the imposition of an angular rate vector normal to the axis of the spinning will produce a circumferential displacement of the fluid annulus relative to its housing. The angular rate of this displacement is proportional to the rate of change of sensed angular velocity (angular acceleration) produced by the kinematic coupling. Implicit in the transformation of this vector onto the rotating frame of the liquid annulus where it interacts with the dynamics of the ring to produce the noted circumferential motion. In effect, the constant input rate vector is harmonically modulated by the kinematic coupling action.

Motion of the annulus fluid is detected electrically by direct coupling, through conductive properties of the fluid, to eddy currents generated in the fluid as it moves through the field of a magnet affixed to the housing of the liquid annulus. The signal voltage so generated is proportional to the velocity of fluid circulating around the annulus, giving an output proportional to kinematically coupled angular acceleration. Note that the annular accelerator produced by the kinematic coupling is proportional to the constant rate vector input. The signal so generated is transferred through the suspension of the disk to synchronous demodulators for spatial resolution into voltages referred to two axes which are perpendicular to each other and to the spindle axis of the disk. The two voltages so produced provide a measure of any rate vector or vectors applied in a plane normal to the spindle axis of the liquid annulus bearing structure.

The present invention utilizes an angular accelerometer of the type described above as the fundamental inertial element for sensing angular velocity about one or more axes. The rate sensor is mounted in gimbals which, positioned in response to signals generated by the inertial rate sensor, enable the measurement of steady state as well as time variant effects including rate and angular displacement. By synchronous demodulation, signals derived from the sensor are resolved into in-phase and quadrature components relative to the spindle reference axis. Signals representative of the DC analogue of rate for two independent and orthogonal rate vectors are thus derived. These signals are each dynamically processed and then applied to torquers mechanically implemented to act upon the gimbal set. The torquers operate in a direction which reduces the error signal supplied to them to zero. The gimbals are instrumented with angle transducers which permit observation of the position of the gimballed sensor relative to the frame upon which it is mounted.

3. Prior Art

In U.S. Pat. No. 3,618,399, a concept is described which provides a means for measuring angular velocity through kinematic coupling. The apparatus disclosed, however, does not provide for direct measurement of angular change of position.

Another aspect of prior art is disclosed in U.S. Pat. No. 3,960,691. Here, the liquid ring and housing is used in a non-rotating mechanization to provide for the measurement of transient or oscillatory effects. As such, it does not suffice for the many applications which require measurement of steady state effects.

It is an object of the present invention to meet the above identified needs.

BRIEF DESCRIPTION OF THE DRAWINGS

FIG. 5 is a block diagram of a circuit for generating servo signals useful in producing inertial angle measurements in the apparatus of FIG. 4.

DETAILED DESCRIPTION OF THE INVENTION

Figure 1:
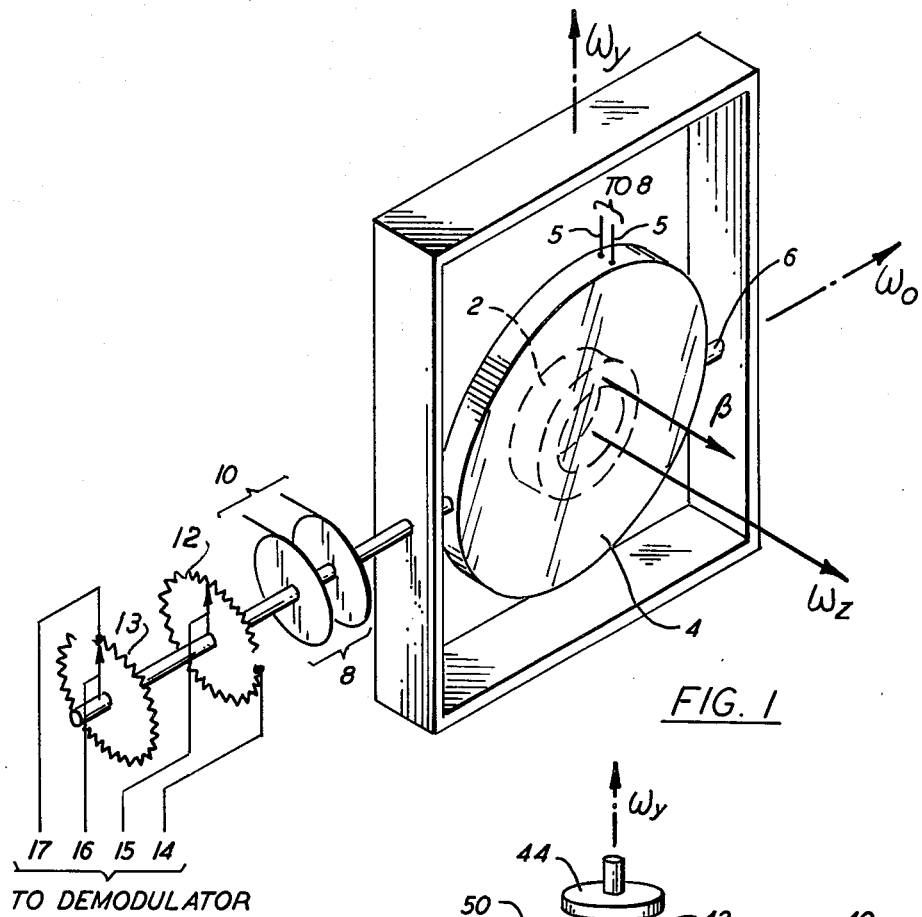
FIG. 1 is a schematic representation of a single axis angular accelerometer constituting the basic inertial element of the invention.

Reference is now made to FIG. 1 in which the inertial rate sensor utilized in the invention is schematically shown to include liquid annulus 2 carried in disk 4 which is rotatably mounted on spindle 6; the axis of spindle 6 passes through the plane of the annulus 2. Liquid annulus 2, shown schematically by dashed lines, comprises a ring of conducting fluid whose motion is electrically detected by means of electrodes (not shown) connected to leads 5 and the motion-related signals supplied to slip rings 8 on spindle 6. The electrodes transfer out potential differences resulting from eddy currents flowing in the fluid which are generated as a result of motion of the fluid through the flux of a magnetic field $\beta$. The field $\beta$ is produced by means of a permanent magnet (not shown), assembled to and turning with disk 4. The signals are removed from slip rings 8 via connecting leads 10 for transmission to demodulation circuitry to be described below. Spindle 6 also carries function potentiometers 12 and 13, shown schematically, and having potentiometer connections 14, 15, 16 and 17 for transmitting annulus position information to the demodulator circuitry. The foregoing structure being known in the art, detailed description here is omitted in the interest of brevity.

When liquid annulus 2 is spun about the axis provided by spindle 6 at a rate denoted $\omega_0$ in FIG. 1 and the sensor assembly as a whole is exposed to an input of angular velocity $(\omega_z, \omega_y)$, the motion-related signal generated is proportional to the angular velocity. This signal is made available via slip rings 8 and contacts 10 for resolution into signals representing the angular velocities $\omega_y$ and $\omega_z$ as shown in the block diagram of FIG. 2.

Figure 2:
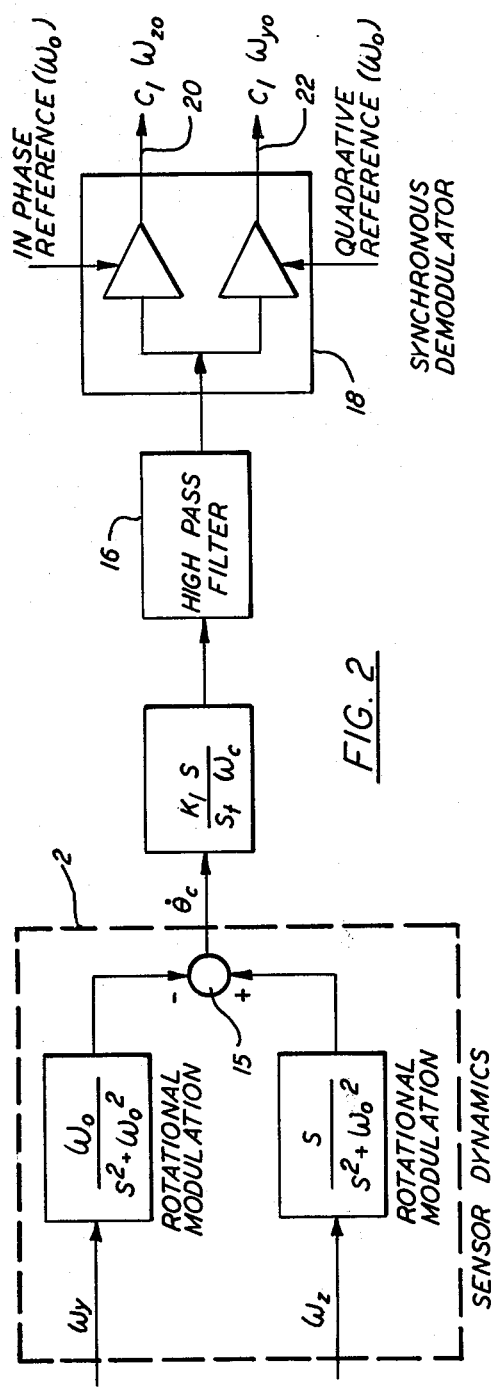
FIG. 2 is a block diagram outlining an analytic process useful for deriving rate information from the structure of FIG. 1.

In FIG. 2, the angular velocity input to the sensor is shown resolved into components $\omega_y$ and $\omega_z$, orthogonal to the spindle ($\omega_0$) axis. These angular velocity components are, for the purposes of analysis, diagramatically shown as inputs to the sensor (represented by dashed lines) which, by virtue of kinematic coupling, effects a spatial transformation to produce $\dot{\theta}_c$; where $$\dot{\theta}_c = \omega_z \cos \omega_0 t - \omega_y \sin \omega_0 t$$

The $\dot{\theta}$ vector, so effected, interacts with the liquid annulus to produce a signal voltage ($e_o$). This is processed through high pass filter 16 to synchronous demodulator 18 for transformation into in-phase and quadrature components $C_1\omega_{zo}$ and $C_1\omega_{yo}$.

The angular response capability of the sensor is achieved, in effect, by modulating the input rate vectors, $\omega_y$ and $\omega_z$, by the mechanized rotation of the annulus at speed $\omega_0$. The effect of this is best understood by consideration of the following analytical steps starting from the differential equation governing the response of the liquid ring, i.e. where:

$J\ddot{\theta} + D\dot{\theta} = D\dot{\theta}_c$
J = Moment of inertia of the liquid ring
D = Viscous damping coefficient of the liquid ring within its disk shaped container
$\theta$ = Inertial angle response of the liquid ring
$\theta_c$ = Case input angle.

Solving equation (1) for the relative angle $\theta_c - \theta$ in the La Place domain yields $$(\theta_c - \theta)(S) = \frac{J\dot{\theta}_c(S)}{JS + D} \quad (2)$$

The eddy voltage pick off of the annulus 2 has an output characteristic:

$$e_{0(S)} = K_1(\dot{\theta}_c - \dot{\theta})(S) \quad (3)$$

Application of this to equation (2) results in $$e_{0(S)} = \frac{K_1 S \dot{\theta}_c(S)}{S + \omega_c} \quad (4)$$

where $\omega_c = D/J$.

Referring to FIG. 1 and recognizing that the sensing axis is normal to the disk plane, the case rate $\dot{\theta}_c$ expressed in the time domain is:

$$\dot{\theta}_c = \omega_z \cos \omega_0 t - \omega_y \sin \omega_0 t \quad (5)$$

where $\omega_z$ and $\omega_y$ are vectors fixed to the nonrotating frame.

Transformation of equation 5 to the LaPlace domain yields:

$$\dot{\theta}_c(S) = \frac{\omega_z S}{S^2 + \omega_0^2} - \frac{\omega_y \omega_0}{S^2 + \omega_0^2} \quad (6)$$

Substitution into equation 4 yields:

$$e_{0}(S) = \frac{K_1 S[\omega_z S - \omega_y \omega_0]}{(S + \omega_c)(S^2 + \omega_0^2)} \quad (7)$$

where $\omega_c = D/J$.

Transformation of this to the time domain yields:

$$e_{0(t)} = \frac{K_1 \omega_0}{\sqrt{\omega_c^2 + \omega_0^2}} [\omega_z \cos \omega_0 t + \omega_y \sin \omega_0 t] \quad (8)$$
$$+ \left[ \frac{K_1 \omega_c[\omega_y 0 + \omega_z \omega_c]}{\omega_c^2 + \omega_0^2} \right] e^{-\omega_c t}$$

By use of high pass filter 16 (FIG. 2) the exponential portion of $e_0(t)$ is rejected; the output data takes the form of a DC analog of rate represented by signals $C_1\omega_{z0}$ and $C_1\omega_{y0}$ appearing at output terminals 20 and 22 of the block diagram of FIG. 2.

Figure 3:
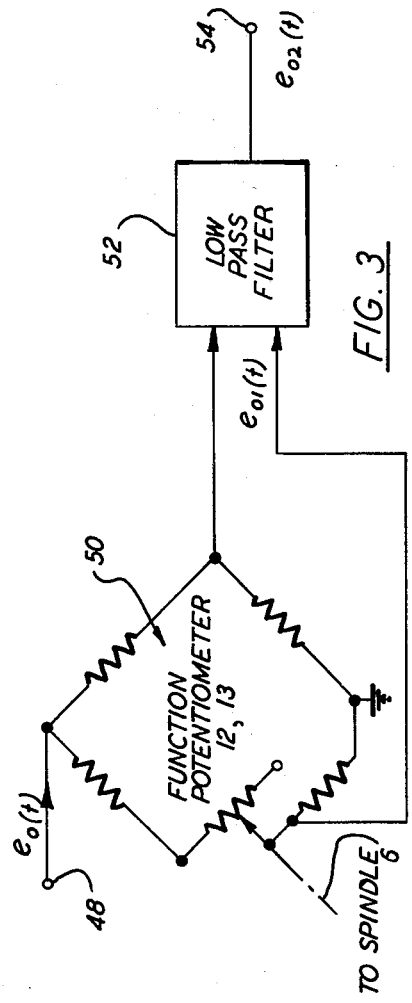
FIG. 3 is a schematic diagram of a circuit for synchronous demodulation of a rate proportional signal on a reference axis of FIG. 1.

FIG. 3 is a schematic diagram of a circuit useful for synchronous demodulation of the transducer signal. In this circuit, a sawtooth waveform generated by sine potentiometer 12 or cosine potentiometer 13 as it is turned by spindle 6 (FIG. 1) is used to resolve the output voltage of sensor 4 into X and Y components. Thus, the sensor output voltage $e_0(t)$ is applied via terminal 48 across Wheatstone bridge 50; the potentiometer 12 or 13 forms part of one leg of the bridge. Wheatstone bridge 50 serves as a multiplying element whose output is the product of the annulus pick-off signal $e_{0(t)}$ and a voltage proportional to the synchronous resistance variation effected by the potentiometer 12 or 13. The output $e_{01(t)}$ of Wheatstone bridge 50 is passed through low filter 52 and is available at terminal 54 as $e_{02(t)}$. It will be understood that two circuits of this kind are required, one for the function potentiometer of each axis, to generate a rate proportional voltage referred to that axis.

Analytically, the pick-off signal $e_{0(t)}$ of Equation 8 has the form:

$$e_{0t} = A[\omega_z \cos \omega_0 t + \omega_y \sin \omega_0 t] + Be^{-\omega_c t} \quad (9)$$

where A and B are constants.

By processing this signal through cosine potentiometer 13, for example, the following form is derived:

$$e_{01(t)} = \frac{A\omega_z}{2} + B e^{-\omega_c t} \cos \omega_0 t + \frac{A\omega_y}{2} \sin 2\omega_0 t \quad (10)$$
$$+ \frac{A\omega_z}{2} \cos 2\omega_0 t$$

By means of low pass filter 52 this signal is transformed into the following:

$$e_{02(t)z} = A\omega_z/2 \quad (11)$$

A similar process, simultaneously carried out by means of sine potentiometer 12 to yield:

$$e_{02(t)y} = A\omega_y/2 \quad (12)$$

These provide a measure of $\omega_y$ and $\omega_z$.

Figure 4:
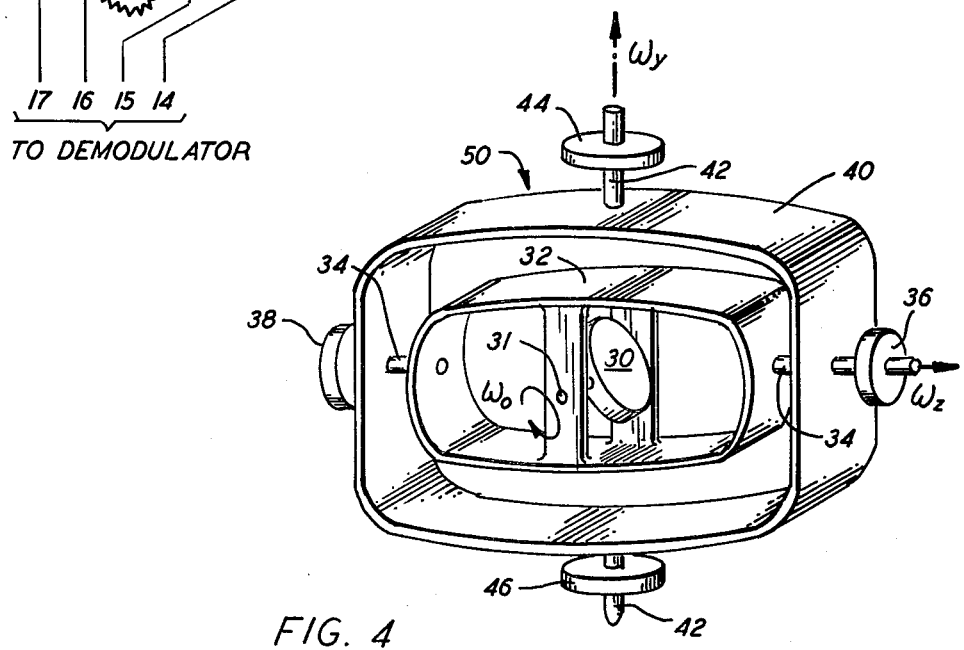
FIG. 4 is a view of a gimbal suspension instrumented for measuring steady state angles in accordance with the teachings of the invention.

The schematic inertial sensor described above is used, according to the teachings of the invention, to generate steady state responses in the gimballed transducer of FIG. 4. There, an inertial sensor disk 30, like that shown in FIG. 1, is mounted for rotation at the rate $\omega_0$ on spindle 31 carried by inner gimbal 32. Inner gimbal 32 is, in turn, mounted on spindle 34 in outer gimbal 40.

The axis of rotation of the annular ring is orthogonal to the gimbal axes established by gimbal spindles 31 and 34. Z-axis gimbal angle transducer 36 and Z-axis torquer 38, both of a nature well known in the art, are connected between spindle 34 and outer gimbal 40. Outer gimbal 40 is, in turn, supported by spindle 42 connected to the vehicle frame (not shown) and is provided with Y-axis gimbal transducer 44 and Y-axis torquer 46.

As will be understood by those skilled in the art, transducers 36 and 44 may be simple position indicating dials or, more usually, they may be angle transducers, such as synchros.

The effect of mounting the inertial sensor in gimbals as shown in FIG. 4 is to create a device which has the capability of retaining a fixed angular attitude in space and which has the capability of a steady state response. This steady state response is produced by processing the rate proportional signals $e_{02(t)z}$ and $e_{02(t)y}$ (derived above) in the circuitry of the block diagram of FIG. 5 to produce control voltages for application to Y-axis torquer 46 and Z-axis torquer 36, generating equal and opposite rates to the input rates $\omega_y$ and $\omega_z$. This has the effect of decoupling the inner gimbal 32 from the angular motion of any vehicle to which it is mounted. The change position of a vehicle carrying the inertial angle transducer of FIG. 4 is therefore sensed by means of the gimbal transducer outputs. Since the position of the sensor relative to inertial space is left unchanged, the true angle of the vehicle relative to inertial space may be measured and displayed at any time.

The block diagram of FIG. 5 shows schematically the system by means of which the above process is accomplished. There, signals $C_1\omega_{y0}$ and $C_1\omega_{z0}$ are passed from synchronous demodulator 52 through individual corner filters 56 and 57 and amplifiers 60 and 61 to Y and Z axis torquers 38 and 40; there the corrective angular accelerations are generated and applied to the gimbals supporting sensor 50. The angle of sensor 50 relative to inertial space may be read off by means of indicators 36 and 44.

It will be understood by those skilled in the art that structures other than those described above may be used for read-out and synchronous demodulation. For example, a diode may be employed to read reflected light from a spindle encoder comprising a half turn of reflective material on the circumference of the inertial sensor drive spindle. Since the collector to emitter resistance of the diode rises significantly with base potential and the base potential varies synchronously with the reflected light, the diode output may be applied to and used to demodulations in a Wheatstone bridge like that of FIG. 3.

The demodulation techniques employed in the performance of the invention use "space commutation" to effect synchronous rectification. In such systems, precise frequency control is not required and, accordingly, the spindle speed of the kinematic inertial sensor need not be held precisely constant. Therefore, the invention has utility in circumstances where it is desirable to allow the spindle to coast rather than to rotate at sustained speed. For such short duration applications the spindle may be driven up to speed by means of a gas driven turbine or spring drive, as will be understood by those skilled in the art.

What is claimed is:

1. A kinematic inertial sensor for measuring angular velocity and position relative to inertial space about one or more measurement axes including:
   an angular rate sensor having a ring of conducting fluid contained in a housing which is mounted for rotation on an axis passing through and parallel to the plane of the ring and which has an electric signal output proportional to the rate of movement of the fluid in response to angular rate inputs in directions normal to the spindle axis,
   a set of gimbals for supporting the angular rate sensor for motion about axes orthogonal to the spindle axis,
   means for generating electric signals relating position of the rate sensor about an axis normal to the spindle axes,
   means for applying accelerating torque to each of the gimbals,
   means for measuring the angle of each gimbal with respect to a vehicle frame,
   means for resolving the angular rate proportional signal of the accelerometer into components related to the measurement axes,
   means for processing each component to produce a signal proportional to the angular rate, and
   means for applying the control signals so produced to the gimbal torquers to offset the angular rate experienced by the rate sensor.

2. An inertial sensor for measuring angular position relative to inertial space about a plurality of measurement axes including:
   an inertial rate sensor spun so that the angle between its sensitive axis and the measurement axes varies with time,
   means for generating a signal proportional to acceleration of the sensor about its sensitive axis,
   means for deriving components of the signal relative to the measurement axes,
   a set of gimbals supporting the rate sensor for motion about the measurement axes,
   torquers for applying force to each of the gimbals,
   means for processing each component to produce a control signal proportional to the angular acceleration experienced by the rate sensor for application to the torquers to offset the acceleration of the sensor.

* * * * *